(12) United States Patent
Tanaka et al.

(10) Patent No.: US 12,359,755 B2
(45) Date of Patent: Jul. 15, 2025

(54) PIPE JOINT, SPACER PROVIDED IN PIPE JOINT, AND DIVIDING PIECE CONSTITUTING SPACER

(71) Applicant: KUBOTA CORPORATION, Osaka (JP)

(72) Inventors: Ryunosuke Tanaka, Amagasaki (JP); Yuito Komaru, Amagasaki (JP); Keita Oda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/695,993

(22) PCT Filed: Sep. 30, 2022

(86) PCT No.: PCT/JP2022/036720
§ 371 (c)(1),
(2) Date: Mar. 27, 2024

(87) PCT Pub. No.: WO2023/058574
PCT Pub. Date: Apr. 13, 2023

(65) Prior Publication Data
US 2024/0392903 A1 Nov. 28, 2024

(30) Foreign Application Priority Data
Oct. 5, 2021 (JP) .................. 2021-163777

(51) Int. Cl.
*F16L 21/03* (2006.01)
*F16L 21/08* (2006.01)
*F16L 25/12* (2006.01)
(52) U.S. Cl.
CPC ............... *F16L 25/12* (2013.01); *F16L 21/08* (2013.01)

(58) Field of Classification Search
CPC ......... F16L 21/03; F16L 21/08; F16L 21/007; F16L 21/02; F16L 21/04; F16L 25/065;
(Continued)

(56) References Cited

U.S. PATENT DOCUMENTS 5,609,368 A * 3/1997 Maki ...................... F16L 21/08
285/321
5,613,714 A * 3/1997 Toshima ................. F16L 21/08
285/321

(Continued)

FOREIGN PATENT DOCUMENTS

CN 108591648 A 9/2018
EP 4 043 771 A1 8/2022
(Continued)

OTHER PUBLICATIONS

International Search Report from corresponding International Patent Application No. PCT/JP2022/036720, dated Nov. 29, 2022.

(Continued)

*Primary Examiner* — Aaron M Dunwoody
(74) *Attorney, Agent, or Firm* — Renner, Otto, Boisselle & Sklar, LLP

(57) ABSTRACT

A spacer for limiting the movement of a spigot in an insertion direction is mounted between a distal end portion of the spigot and a deep end face of a socket. The spacer has a cylindrical body sandwiched between the distal end portion of the spigot and the deep end face of the socket, a contact portion in contact with the deep end face of the socket on an end portion of the body, a centering contact face in contact with an inner surface of the socket, and a separating face that is separated from the deep end face of the socket in a removing direction of the spigot. A gap surrounded by the separating face of the spacer, the deep end face of the socket, and the inner surface of the socket is (Continued)

formed. The gap lies outside the contact portion of the spacer in a radial direction.

6 Claims, 22 Drawing Sheets

(58) Field of Classification Search
CPC . F16L 25/08; F16L 25/10; F16L 47/06; F16L 47/065; F16L 47/08
See application file for complete search history.

(56) References Cited

U.S. PATENT DOCUMENTS

| | | | | |
|---|---|---|---|---|
| 5,887,913 | A | * | 3/1999 | Kojima ............... F16L 21/08 285/85 |
| 2011/0278835 | A1 | | 11/2011 | Kishi et al. |
| 2017/0219151 | A1 | * | 8/2017 | Filer ..................... F16L 21/03 |
| 2020/0208765 | A1 | | 7/2020 | Kishi et al. |
| 2021/0095798 | A1 | | 4/2021 | Kishi et al. |

FOREIGN PATENT DOCUMENTS

| | | | | |
|---|---|---|---|---|
| JP | 2004162854 | A | | 6/2004 |
| JP | 2011106671 | A | | 6/2011 |
| JP | 5721392 | B2 | * | 5/2015 ............ F16L 17/032 |
| JP | 2019199909 | A | | 11/2019 |
| JP | 2020101194 | A | | 7/2020 |
| JP | 2020106065 | A | | 7/2020 |
| JP | 202167283 | A | | 4/2021 |
| WO | 2021075298 | A1 | | 4/2021 |

OTHER PUBLICATIONS

Extended European Search Report issued in European Patent Application No. 22878443.5 dated Feb. 10, 2025.

* cited by examiner

PIPE JOINT, SPACER PROVIDED IN PIPE JOINT, AND DIVIDING PIECE CONSTITUTING SPACER

FIELD OF THE INVENTION

The present invention relates to a pipe joint having a separation preventive function, a spacer provided in the pipe joint, and a dividing piece constituting the spacer.

BACKGROUND OF THE INVENTION

Conventionally, in such a pipe joint, a spigot 202 of a first pipe 201 is inserted into a socket 204 of a second pipe 203 as illustrated in FIG. 24, for example. A lock ring 206 is housed in a groove 205 formed on an inner surface of the socket 204. A projection 207 that can be engaged with the lock ring 206 from a deeper portion of the socket 204 is formed on an outer surface of the spigot 202.

A rubber band 208 for sealing is provided between the outer surface of the spigot 202 and the inner surface of the socket 204. A gland 209 to press the rubber band 208 between the outer surface of the spigot 202 and the inner surface of the socket 204 is coupled to an opening end face of the socket 204 with a bolt 210 and a nut 211.

A pipe joint 200 configured thus includes a spacer 212. The spacer 212 is for limiting the movement of the spigot 202 in an insertion direction. The spacer 212 is a cylindrical member sandwiched and mounted between a distal end portion of the spigot 202 and a deep end face 213 of the socket 204.

Thus, provision of the spacer 212 limits a movement of the spigot 202 in the insertion direction.

If a plurality of pipes 201 and 203 are joined to form a pipeline, an uneven force is applied to a bent-pipe portion and an intersection or the like of the pipeline. At a location subjected to such an uneven force, the pipe joint 200 is restrained to be unmovable, so that an extending and contracting function between the spigot 202 and the socket 204 and a bending function at the spigot 202 and the socket 204 are restricted by the spacer 212.

This configuration can prevent the pipeline from being elastic or bendable in a direction along which the uneven force is applied and adversely affecting the sealing capability of the pipe joint 200.

See Japanese Patent Laid-Open No. 2004-162854 for a description on the pipe joint 200 including the spacer 212.

In the conventional form, an outer surface 212a of the spacer 212 is separated from an inner surface 204a of the socket 204, and a gap 214 is circumferentially formed between the outer surface 212a of the spacer 212 and the inner surface 204a of the socket 204. Thus, when the spacer 212 is mounted into the socket 204, the position of the spacer 212 is likely to be displaced in a radial direction B, disadvantageously requiring a lot of time and effort when centering the center of the spacer 212 on the center of the socket 204.

An object of the present invention is to provide a pipe joint that facilitates centering of a spacer when the spacer is mounted, the spacer provided in the pipe joint, and a dividing piece constituting the spacer.

SUMMARY OF THE INVENTION

A pipe joint according to the present invention is a pipe joint in which a spigot formed on a first pipe is inserted into a socket formed on a second pipe, the pipe joint including:

a groove formed on an inner surface of the socket;
a lock ring housed in the groove;
an engaging portion that is formed on an outer surface of the spigot and is engageable with the lock ring from a deeper portion of the socket;
a distal end portion formed on the spigot;
a deep end face formed in the socket; and
a spacer that is mounted between the distal end portion of the spigot and the deep end face of the socket and is for limiting the movement of the spigot in an insertion direction;
wherein the spacer has a cylindrical body sandwiched between the distal end portion of the spigot and the deep end face of the socket, a contact portion in contact with the deep end face of the socket at an end portion of the body in a pipe axial direction, a centering contact face in contact with the inner surface of the socket, and a separating face that is separated from the deep end face of the socket in a removing direction along which the spigot is removed from the socket,
a gap surrounded by the separating face of the spacer, the deep end face of the socket, and the inner surface of the socket is formed,
the gap lies outside the contact portion of the spacer in a radial direction, and
the separating face of the spacer faces the deep end face of the socket in the pipe axial direction and is formed between the contact portion and the centering contact face in the radial direction.

With this configuration, the centering contact face of the spacer comes into contact with the inner surface of the socket, thereby aligning the center of the spacer with the center of the socket without displacing a mounting position of the spacer in the radial direction. Hence, when the spacer is mounted, the spacer can be easily centered with respect to the socket.

The gap is formed between the separating face of the spacer and the deep end face of the socket, and the separating face of the spacer is separated from the deep end face without coming into contact with the deep end face of the socket. Hence, assuming that a force in the insertion direction of the spigot is an insertion force, even when the insertion force is applied from the spigot to the body of the spacer and a reaction force of the insertion force is applied to the body of the spacer from the deep end face of the socket, the reaction force of the insertion force is hardly applied to the separating face of the spacer. This can reduce deformation of a portion where the separating face of the spacer is formed.

According to the pipe joint of the present invention, it is preferable that the spacer has projections that project outward from an outer circumference of the body in the radial direction,
the centering contact face is formed on an outer circumference of the projection,
the separating face is formed on the projection and is tilted in the removing direction of the spigot toward the centering contact face from the contact portion, and
the contact portion is formed at a boundary portion between an end face and the separating face of the body of the spacer that faces the deep end face of the socket.

With this configuration, even when the insertion force is applied from the spigot to the body of the spacer and a reaction force of the insertion force is applied to the body of the spacer from the deep end face of the socket, the reaction force of the insertion force is hardly applied to the separating face of the spacer. This can reduce deformation of the projection of the spacer.

According to the pipe joint of the present invention, it is preferable that the projections are formed at a plurality of locations in the pipe axial direction of the body of the spacer,
the separating face is formed on the projection at a deepmost position of the socket,
the centering contact face is formed on the outer circumference of each of the projections, and
between the projections opposed to each other in the pipe axial direction, a concave portion is formed so as to be recessed inward in the radial direction.

With this configuration, the centering contact faces of the projections of the spacer come into contact with the inner surface of the socket. Thus, an orientation of the spacer is stabilized when the spacer is mounted, achieving high workability during a centering operation of the spacer. Since the concave portion is formed between the projections, a weight of the spacer can be reduced.

According to the pipe joint of the present invention, it is preferable that the contact portion lies between a position corresponding to the outer surface of the body of the spacer in the radial direction and a position corresponding to the inner surface of the body in the radial direction.

With this configuration, when the insertion force is applied from the spigot to the body of the spacer, a reaction force of the insertion force is applied to the contact portion of the spacer from the deep end face of the socket. The contact portion of the spacer lies between a position corresponding to the outer surface of the body of the spacer in the radial direction and a position corresponding to the inner surface in the radial direction. Thus, in the radial direction, a distance between a first point where the insertion force is applied to the spacer and a second point where the reaction force of the insertion force is applied to the spacer is shorter than in the case where the contact portion of the spacer lies outside a position corresponding to the outer surface of the body of the spacer in the radial direction.

A bending moment applied to the spacer is proportionate to the distance between the first point and the second point in the radial direction, so that the bending moment is reduced and a force applied to the spacer substantially acts as a compressive force to the body of the spacer in the pipe axial direction. Thus, the strength of the spacer can be sufficiently kept.

The spacer provided in the pipe joint of the present invention is divided into a plurality of arc-shaped dividing pieces in a circumferential direction, and
ends of the dividing pieces adjacent to each other in the circumferential direction are connected to each other.

With this configuration, a cylindrical spacer can be assembled by connecting the plurality of dividing pieces in the socket.

The dividing piece constituting the spacer of the present invention has connecting portions on both ends.

With this configuration, the connecting portion of one of the dividing pieces adjacent to each other in the circumferential direction and the connecting portion of the other dividing piece are connected via a connector, so that the dividing pieces can be connected to each other.

As described above, according to the present invention, the centering contact face of the spacer comes into contact with the inner surface of the socket, thereby aligning the center of the spacer with the center of the socket. Hence, when the spacer is mounted, the spacer can be easily centered.

DETAILED DESCRIPTION OF THE INVENTION

An embodiment of the present invention will be described below with reference to the accompanying drawings.

First Embodiment

Figure 1:
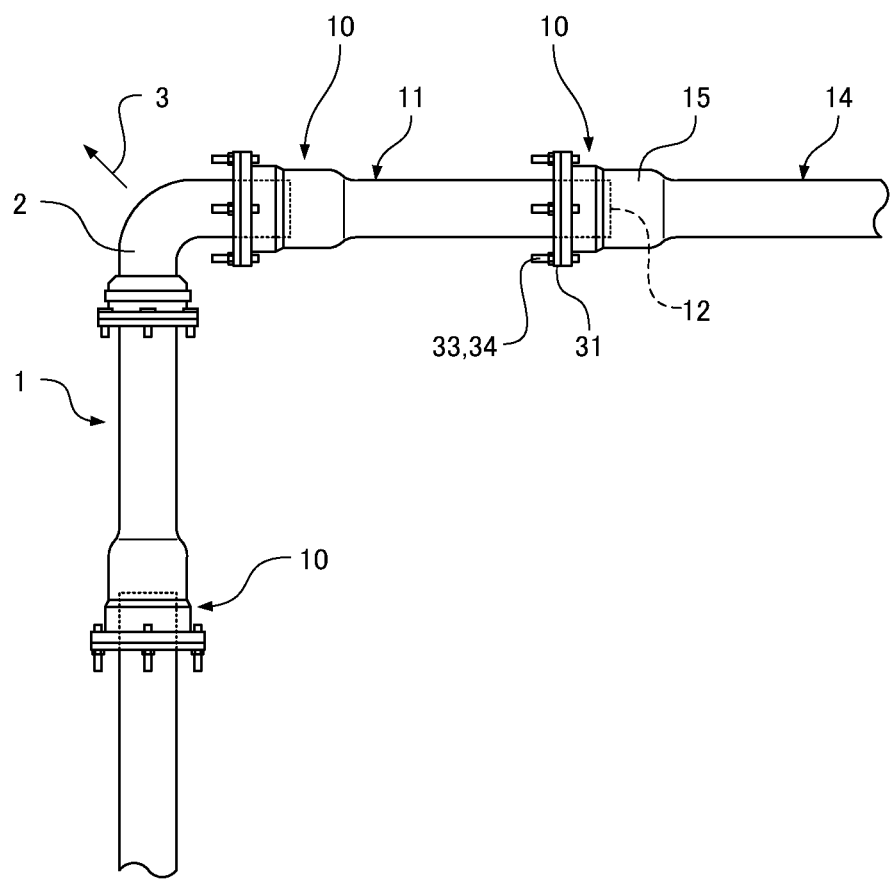
FIG. 1 is a diagram of a pipeline including a plurality of pipes joined by a pipe joint according to an embodiment of the present invention.

As illustrated in FIG. 1, a pipeline 1 is formed by joining a plurality of pipes. The pipeline 1 has a bending portion 2. An uneven force 3 is applied to the bending portion 2.

The pipeline 1 includes a pipe joint 10 having a separation preventive function. In the pipe joint 10, a spigot 12 provided on one end of a first pipe 11 is inserted into a socket 15 provided on one end of a second pipe 14. For example, ductile iron pipes are used for both of the pipes 11 and 14.

Figure 2:
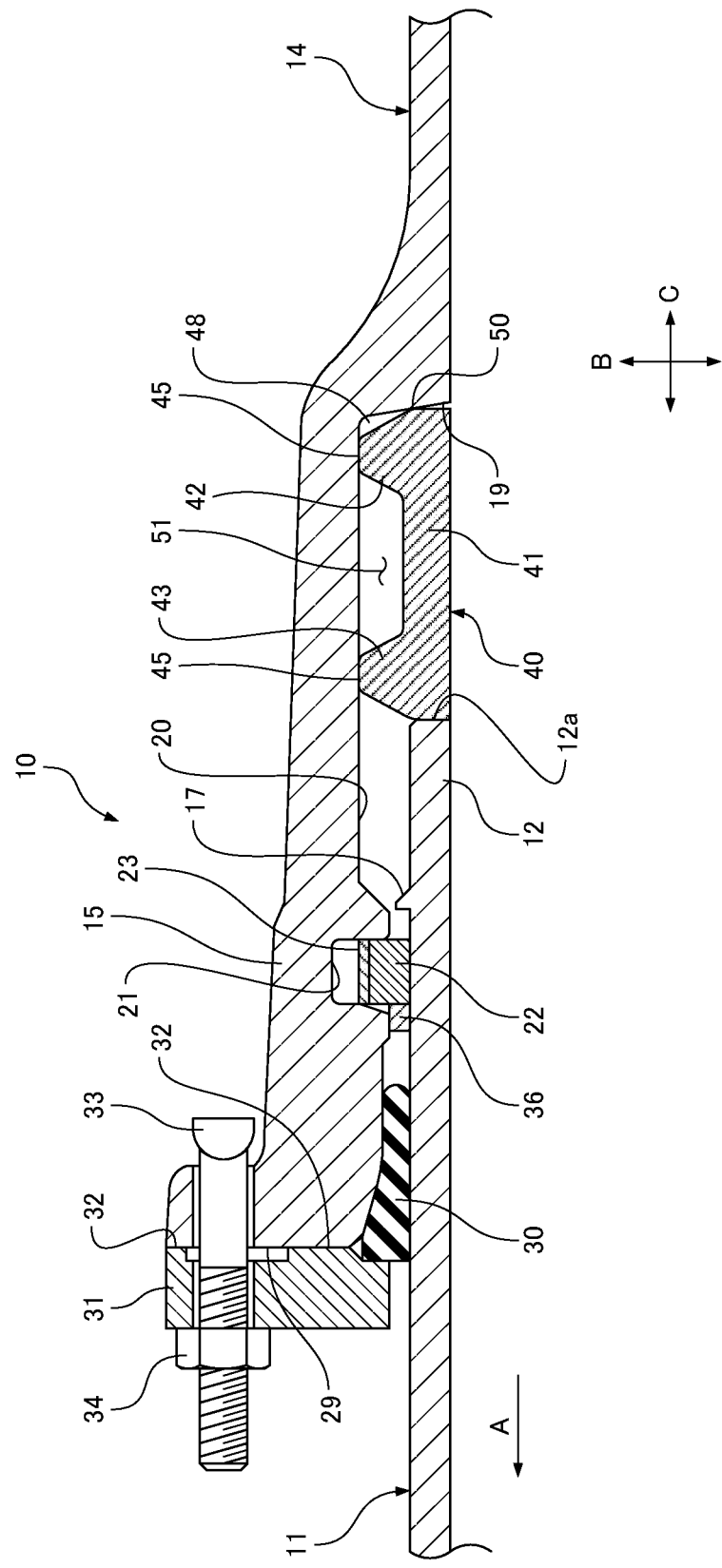
FIG. 2 is a cross-sectional view of the pipe joint.

FIG. 2 is a cross-sectional view of the pipe joint 10. A spigot projection 17 (an example of an engaging portion) is formed around an outer circumference of the spigot 12. The spigot projection 17 is formed at a location that is moved backward from an end face 12a of the spigot 12 by a predetermined length in a removing direction A along which the spigot 12 is removed from the socket 15.

The socket 15 has a deep end face 19 in an annular shape at a deepmost portion thereof. The deep end face 19 is circumferentially formed inward in a radial direction B from a deepmost end portion of an inner surface 20 of the socket 15 and is opposed to the end face 12a of the spigot 12 in a pipe axial direction C.

A groove 21 is circumferentially formed on the inner surface 20 of the socket 15. Housed in the groove 21 are a lock ring 22 and an annular pressing member 23 that presses the lock ring 22 inward in the radial direction B.

Figure 3:
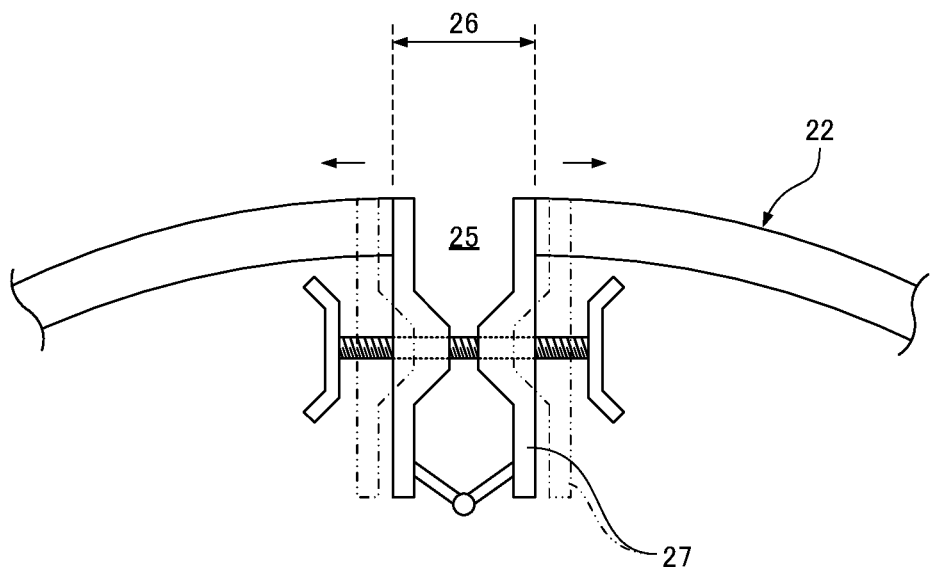
FIG. 3 is a diagram at the time of extension of the diameter of a lock ring provided in the pipe joint.

As illustrated in FIG. 3, the lock ring 22 is a ring having a single-cut structure in which a cut portion 25 is formed at a point in the circumferential direction. The lock ring 22 has elasticity such that the lock ring 22 is increased in diameter by extending a width 26 of the cut portion 25 with an expander 27 and is reduced in diameter to an original diameter by removing the expander 27 from the cut portion 25.

The spigot projection 17 is engaged with the lock ring 22 from a deeper portion of the socket 15 in the removing direction A of the spigot 12, thereby preventing the spigot 12 from slipping out of the socket 15.

At a point closer to an opening end face 29 of the socket 15 than the lock ring 22, a seal ring 30 is provided, which is compressed in the radial direction B to perform sealing between the outer surface of the spigot 12 and the inner surface of the socket 15. The seal ring 30 is a rubber ring that is inserted between the outer surface of the spigot 12 and the inner surface of the socket 15.

The opening end face 29 of the socket 15 has a gland 31 that presses the seal ring 30 into the socket 15. The gland 31 has a contact portion 32 in contact with the opening end face 29 of the socket 15. The contact portion 32 is coupled to the opening end face 29 of the socket 15 with a plurality of T bolts 33 and nuts 34.

A backup ring 36 is provided between the lock ring 22 and the seal ring 30 in the pipe axial direction C. The backup ring 36 is a ring for preventing the seal ring 30 from being pressed by the gland 31 to enter the groove 21. The backup ring 36 is a ring that is located next to the lock ring 22 and has a single-cut structure in which a cut portion is formed at a point in the circumferential direction. The backup ring 36 is fabricated using an elastic material, e.g., resin.

Figure 4:
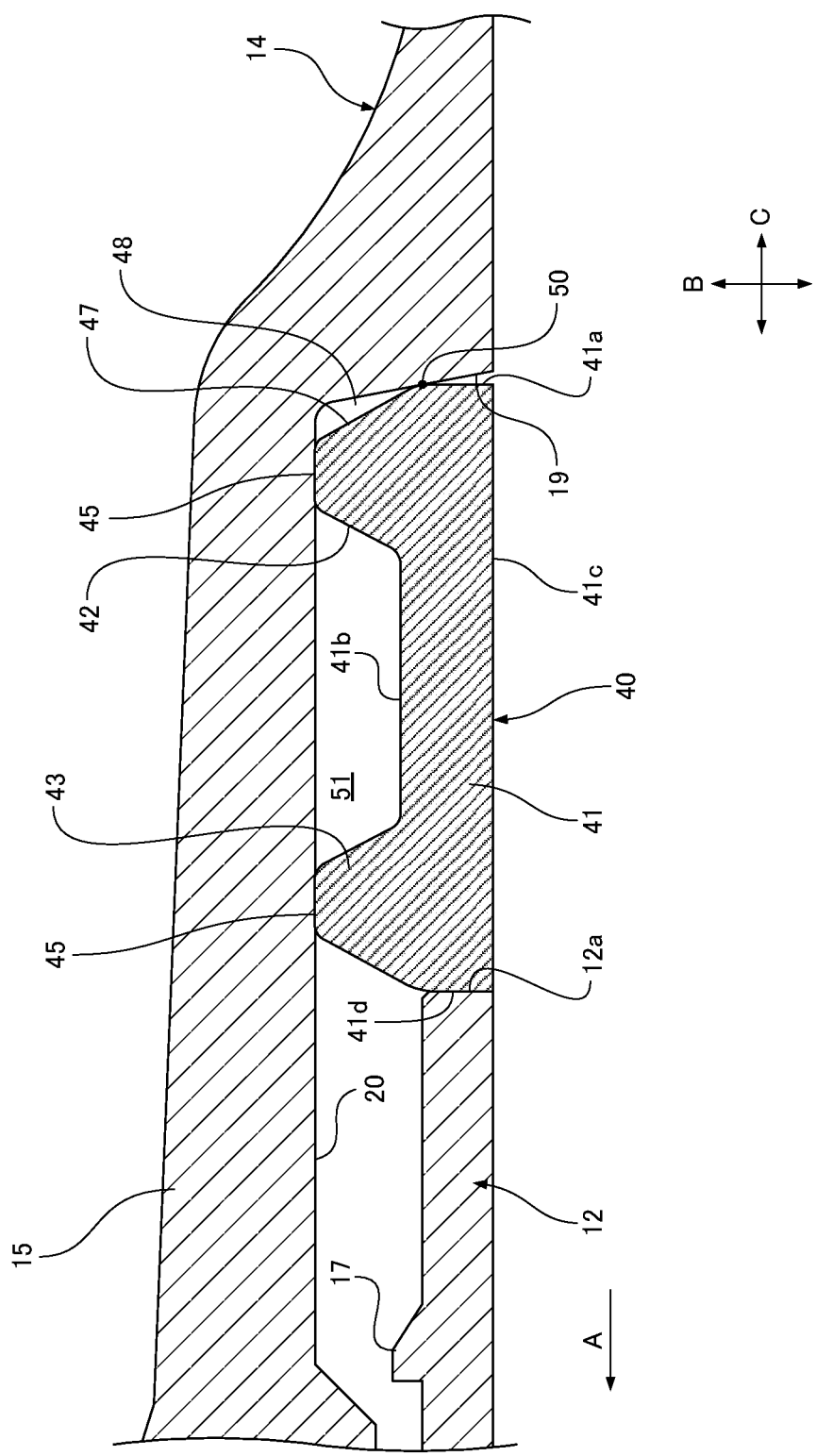
FIG. 4 is a partially enlarged cross-sectional view of the pipe joint.
Figure 5:
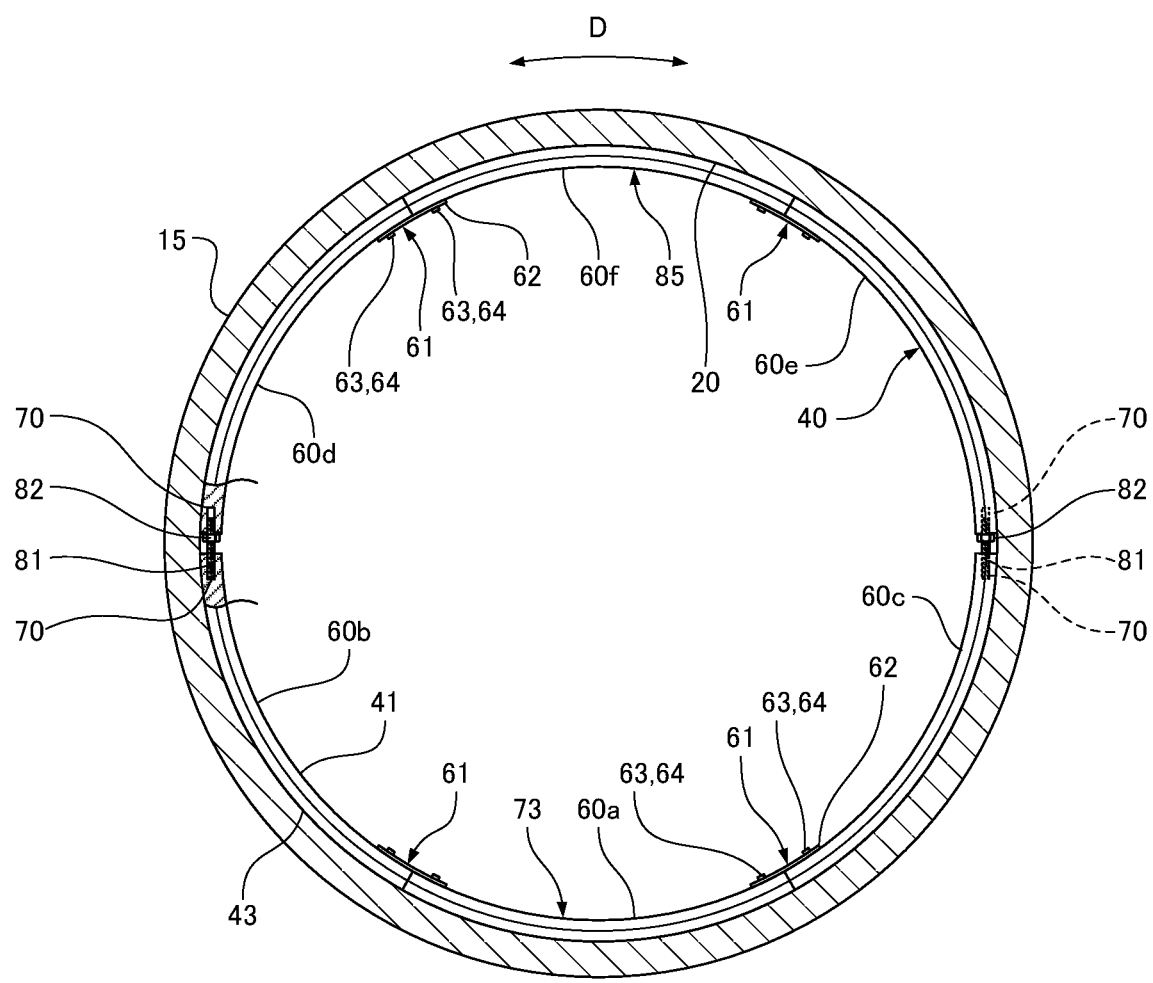
FIG. 5 is a partially cut front view of a spacer provided in the pipe joint.

A spacer 40 for limiting a movement of the spigot 12 in the insertion direction is mounted between the end face 12a of the spigot 12 and the deep end face 19 of the socket 15. As illustrated in FIGS. 2, 4, and 5, the spacer 40 has a cylindrical body 41 sandwiched between the end face 12a of the spigot 12 and the deep end face 19 of the socket 15, a first projection 42 and a second projection 43 that project outward from an outer surface 41b of the body 41 in the radial direction B, and a contact portion 50 in contact with the deep end face 19 of the socket 15.

The first projection 42 and the second projection 43 are circumferentially formed at both ends (two locations) of the body 41 in the pipe axial direction C. In this configuration, the first projection 42 is formed at one end of the body 41, that is, one end near the deep end face 19 of the socket 15. The second projection 43 is formed at the other end of the body 41, that is, the other end near the end face 12a of the spigot 12.

Figure 9:
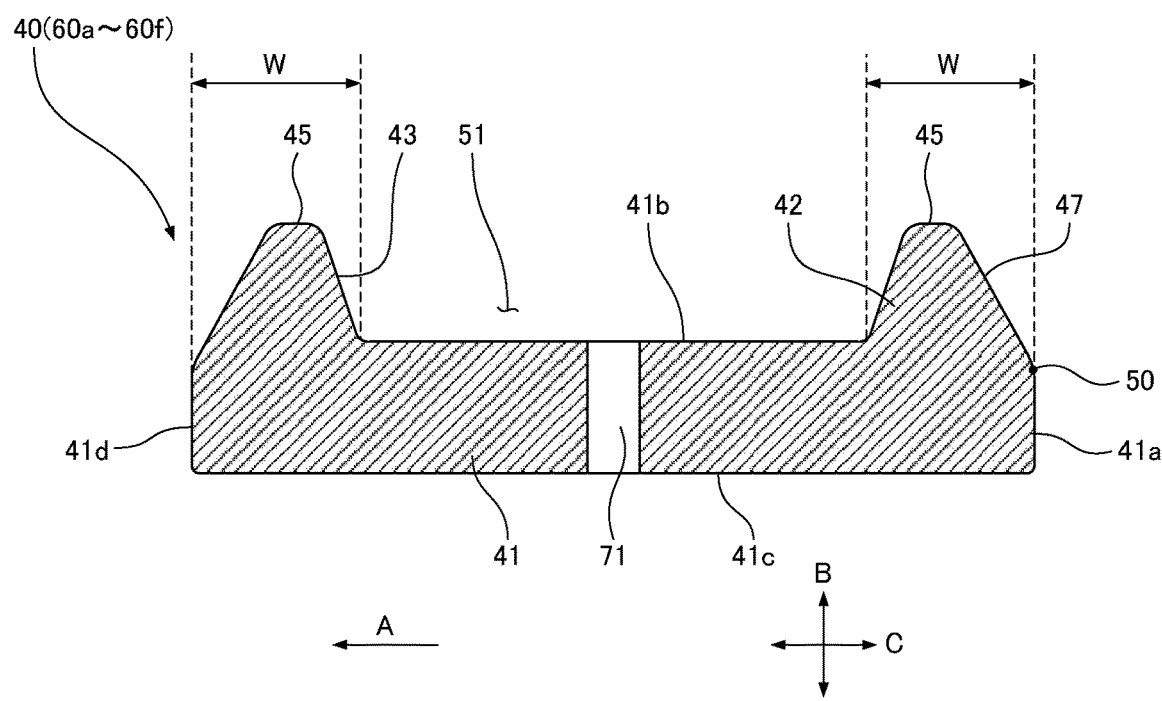
FIG. 9 is a cross-sectional view taken along line Z-Z in FIG. 6.

As illustrated in FIGS. 4 and 9, the first projection 42 and the second projection 43 have a same cross-sectional shape. The first projection 42 and the second projection 43 are trapezoidal in cross section such that a width W in the pipe axial direction C decreases toward the outside in the radial direction B. On the outer circumference of the first projection 42 and the outer circumference of the second projection 43, a centering contact face 45 is circumferentially formed to be brought into contact with the inner surface 20 of the socket 15.

On the first projection 42 (an example of a projecting portion at a deepmost position of the socket 15), a separating face 47 is circumferentially formed, which separates from the deep end face 19 of the socket 15 in the removing direction A of the spigot 12. As illustrated in FIGS. 2 and 4, a gap 48 surrounded by the separating face 47 of the spacer 40, the deep end face 19 of the socket 15, and the inner surface 20 of the socket 15 is circumferentially formed in the socket 15.

The gap 48 is formed outside the contact portion 50 of the spacer 40 in the radial direction B. As illustrated in FIG. 4, the contact portion 50 is formed on one end of the body 41 of the spacer 40 in the pipe axial direction C and is placed in a circular form around the spacer 40 and in line contact with the deep end face 19 of the socket 15.

Figure 8:
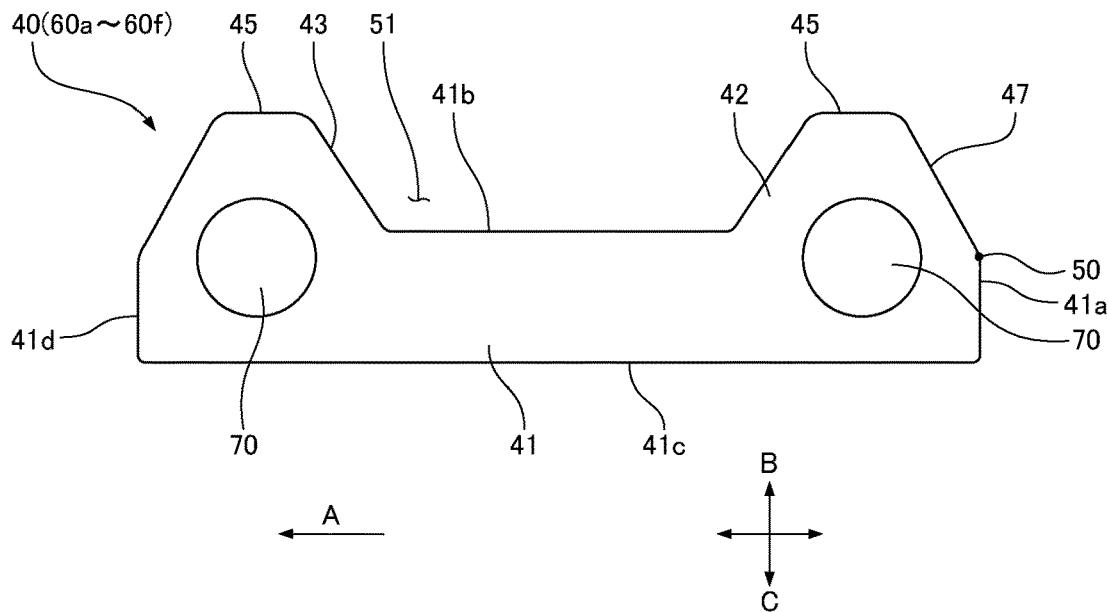
FIG. 8 is a cross-sectional view taken along line Y-Y in FIG. 6.

As illustrated in FIGS. 4, 8, and 9, the separating face 47 is a tapered face that is formed between the contact portion 50 and the centering contact face 45 of the first projection 42 in the radial direction B and is tilted in the removing direction A of the spigot 12 toward the centering contact face 45 of the first projection 42 from the contact portion 50.

The contact portion 50 is circumferentially formed at the boundary portion between one end face 41a and the separating face 47 of the body 41 of the spacer 40 that faces the deep end face 19 of the socket 15. The contact portion 50 lies between a position corresponding to the outer surface 41b of the body 41 in the radial direction B and a position corresponding to an inner surface 41c in the radial direction B.

Between the projections 42 and 43 opposed to each other in the pipe axial direction C, a concave portion 51 is circumferentially formed so as to be recessed inward in the radial direction B.

Inside the contact portion 50 in the radial direction B, the one end face 41a of the body 41 of the spacer 40 is separated from the deep end face 19 of the socket 15.

As illustrated in FIGS. 5 to 9, the spacer 40 is divided into a plurality of (e.g., six in FIG. 5) arc-shaped dividing pieces 60a to 60f in a circumferential direction D. Specifically, the dividing pieces 60a to 60f each have the body 41, the first projection 42, and the second projection 43 of the spacer 40 divided into the pieces in the circumferential direction D.

Figure 10:
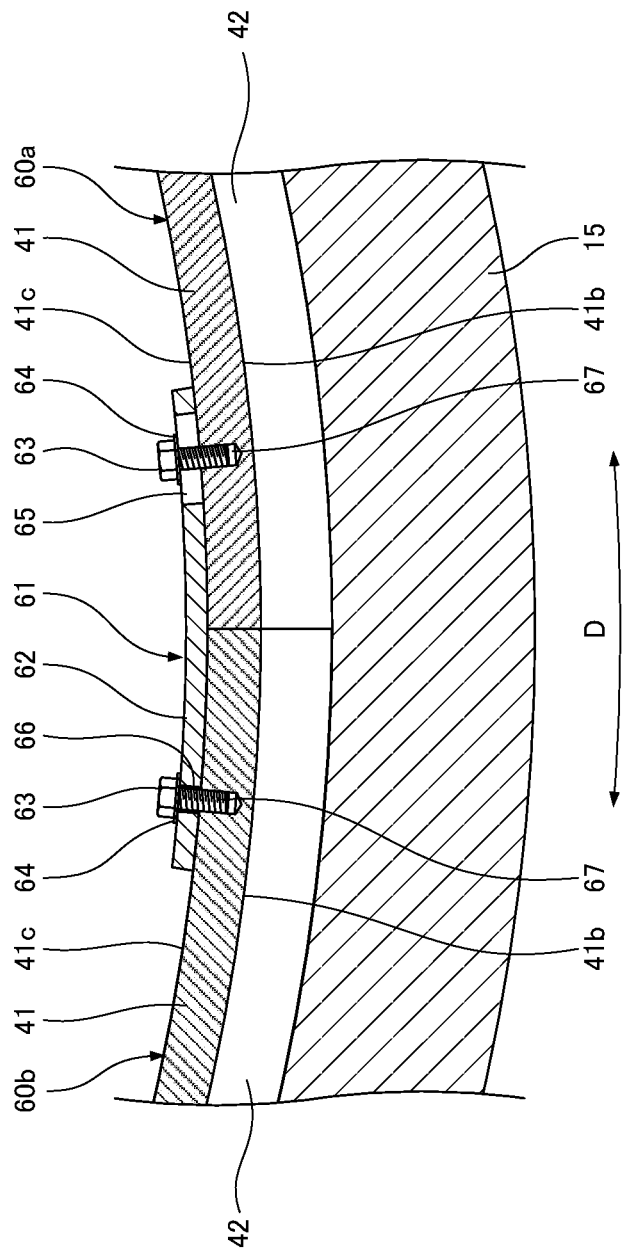
FIG. 10 is a cross-sectional view illustrating a connecting structure between the dividing pieces of the spacer.
Figure 11:
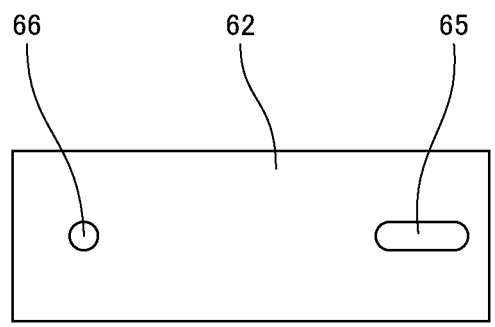
FIG. 11 is a diagram of a connector plate for connecting the dividing pieces of the spacer.

The ends of the dividing pieces 60a to 60f adjacent to each other in the circumferential direction D are connected via a connector 61. As illustrated in FIGS. 5, 10, and 11, the connector 61 includes a connector plate 62, bolts 63, and washers 64. The connector plate 62 has two through holes 65 and 66. The through hole 65 is a long hole.

Figure 6:
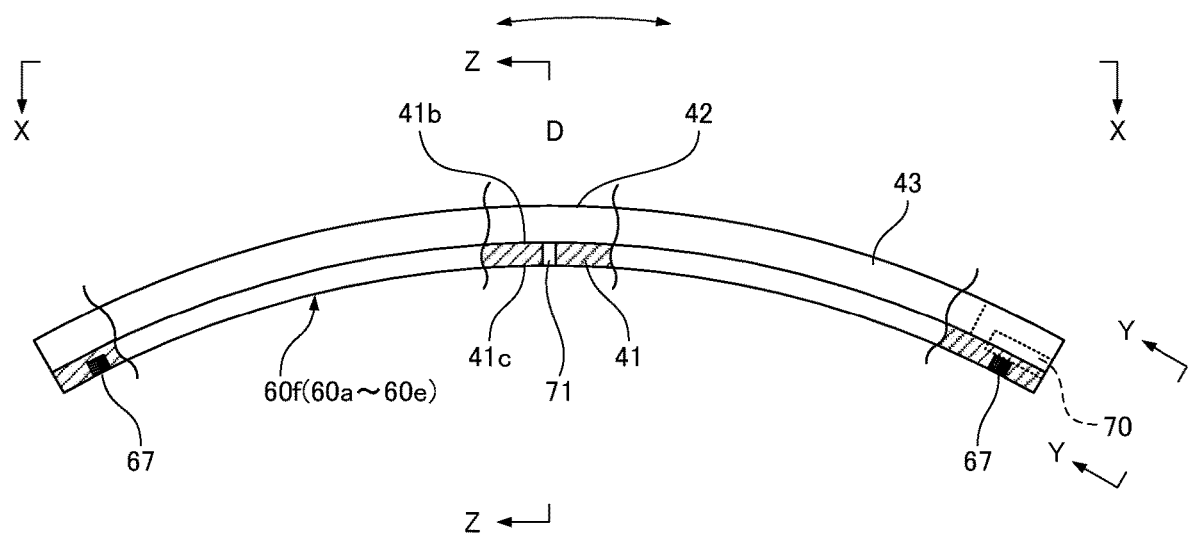
FIG. 6 is a partially cut front view of a dividing piece constituting the spacer provided in the pipe joint.
Figure 7:
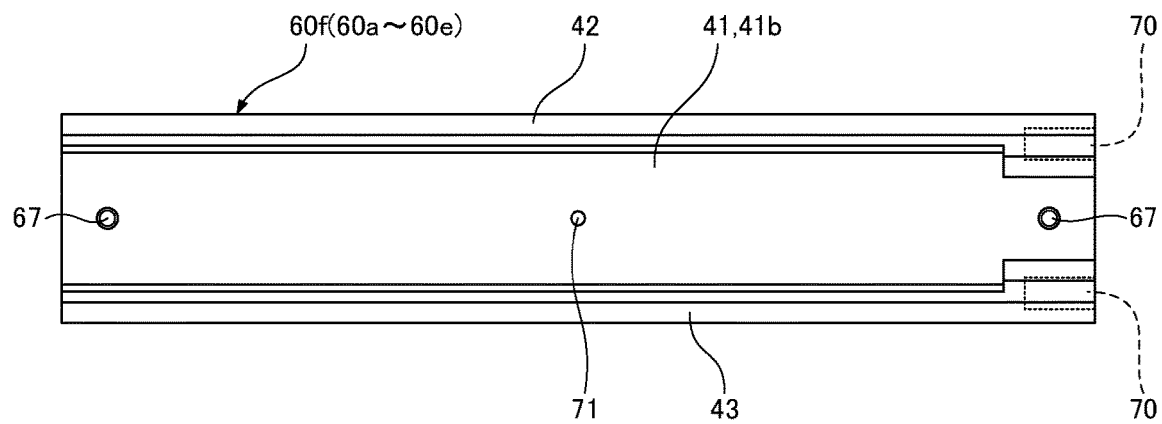
FIG. 7 is a cross-sectional view taken along line X-X in FIG. 6.

As illustrated in FIGS. 6 and 7, tapped holes 67 (an example of a connecting portion) are formed on both ends of each of the dividing pieces 60a to 60f. The tapped holes 67 are opened on the inner surface 41c of the body 41 of each of the dividing pieces 60a to 60f.

As illustrated in FIG. 10, the two bolts 63 are inserted into the washers 64 and the through holes 65 and 66 of the connector plate 62 and are screwed and fastened into the tapped hole 67 of the one dividing piece 60a and the tapped hole 67 of the other dividing piece 60b, the dividing pieces 60a and 60b being adjacent to each other in the circumferential direction D. Thus, the one dividing piece 60a and the other dividing piece 60b are connected to each other via the connector 61. Likewise, the remaining dividing pieces 60c to 60f are also connected via the connector plates 62, the bolts 63, and the washers 64.

As illustrated in FIGS. 6 to 8, a plurality of centering holes 70 are formed on one of the end faces of each of the dividing pieces 60a to 60f in the circumferential direction D. The centering holes 70 are opened on the end face of the first projection 42 and the end face of the second projection 43 of each of the dividing pieces 60a to 60f.

As illustrated in FIGS. 6, 7, and 9, an insertion hole 71 penetrating the outer surface 41b and the inner surface 41c of the body 41 is formed at the central of each of the dividing pieces 60a to 60f in the circumferential direction D.

A method for joining the first pipe 11 and the second pipe 14 in the pipe joint 10 will be described below.

Figure 12:
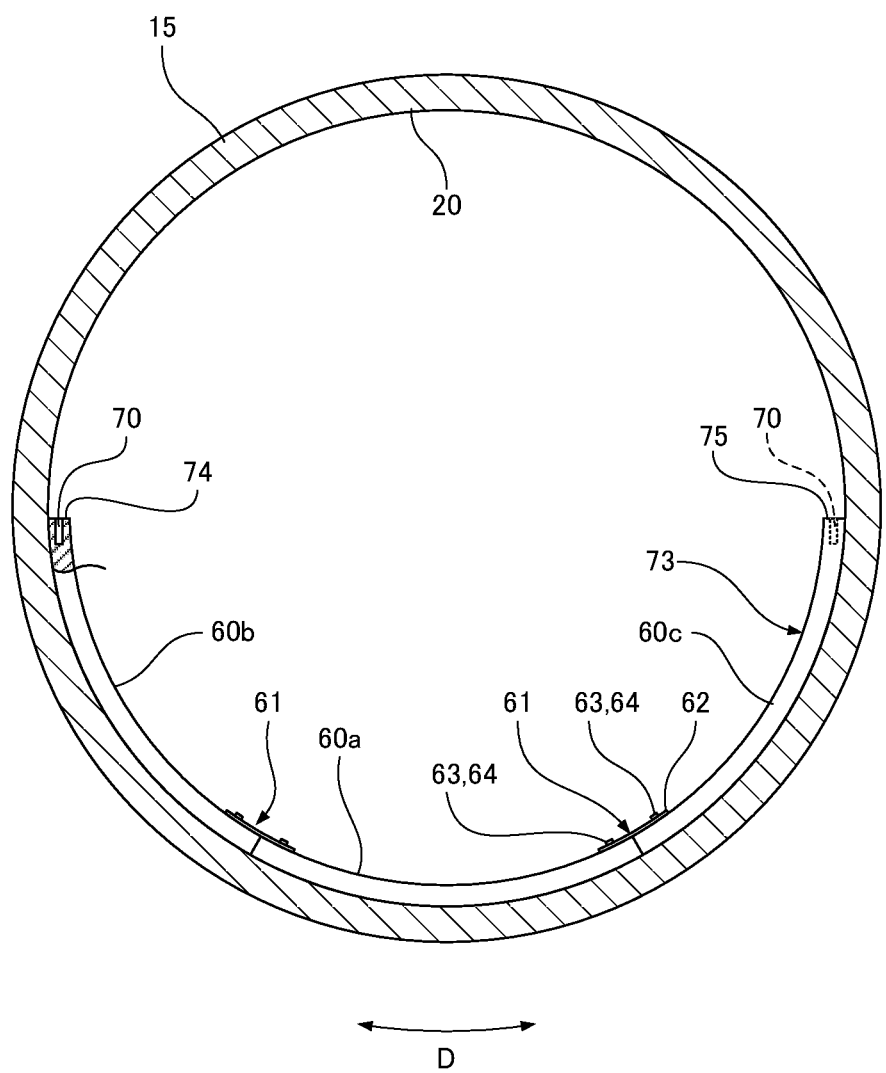
FIG. 12 is a diagram illustrating a procedure of assembling the spacer.

First, the spacer 40 is set in the socket 15 as follows:

As illustrated in FIG. 12, the three dividing pieces 60a to 60c forming the lower half of the inner surface 20 of the socket 15 are disposed in the socket 15. As illustrated in FIGS. 10 and 12, the dividing pieces 60a to 60c in the lower half are connected to one another using the connector plates 62, the bolts 63, and the washers 64, forming a lower semicircular body 73 corresponding to the lower half of the spacer 40.

Figure 13:
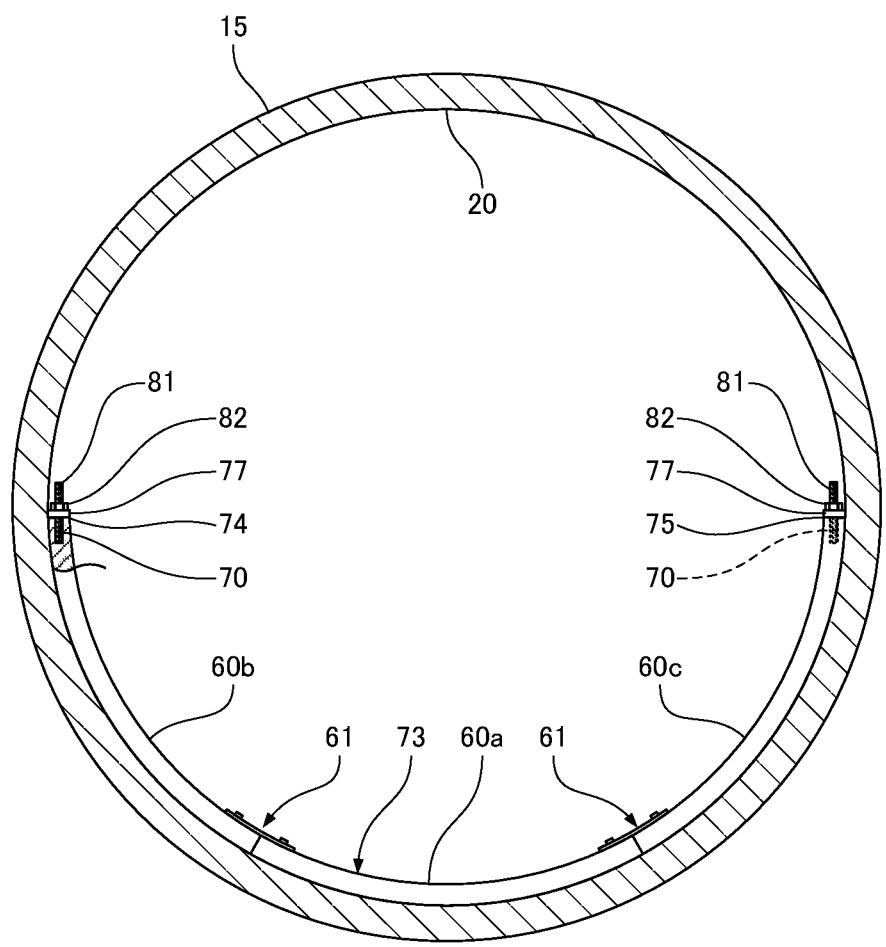
FIG. 13 is a diagram illustrating the procedure of assembling the spacer.
Figure 14:
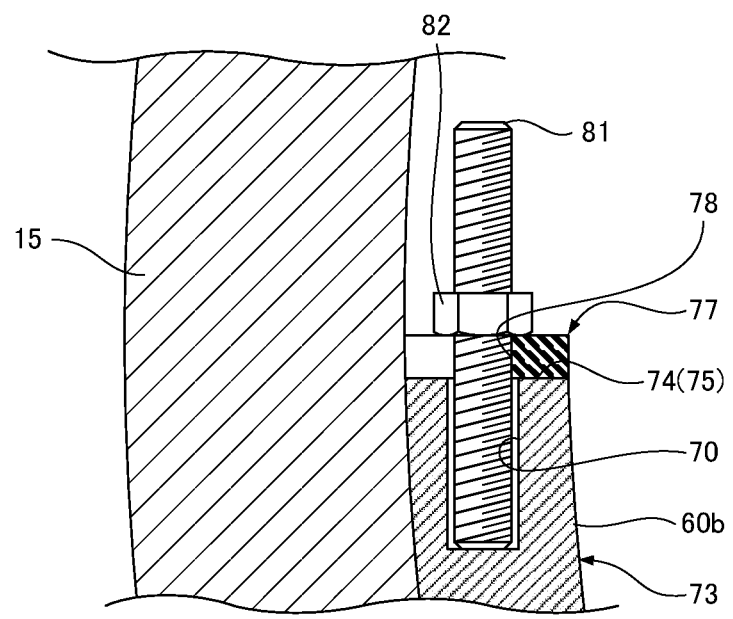
FIG. 14 is a diagram illustrating the procedure of assembling the spacer and an enlarged display of a cross section of a portion around a centering bolt provided in an assembled lower semicircular body.

The centering holes 70 are opened on both end faces 74 and 75 of the lower semicircular body 73 in the circumferential direction D. As illustrated in FIGS. 13 and 14, a bolt retainer 77 is set on each of the end faces 74 and 75.

Figure 15:
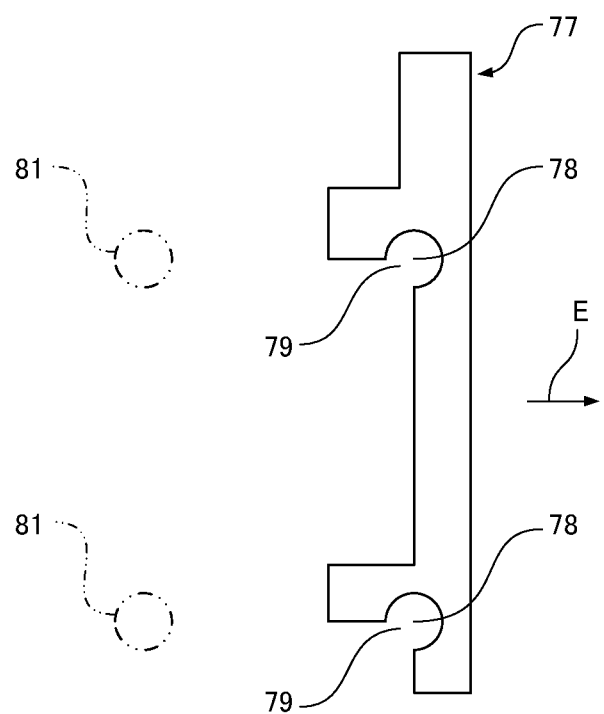
FIG. 15 is a diagram of a bolt retainer used when the spacer is assembled.

As illustrated in FIG. 15, the bolt retainer 77 is provided to align the orientations of a plurality of centering bolts 81 (see FIGS. 13 and 14), which will be described later, and prevent simultaneous bolt-nut rotation of the centering bolts 81. The bolt retainer 77 is an elastically deformable plate made of rubber and has two through holes 78 penetrating the front and back sides in the plate thickness direction and notch portions 79. A notch portion 79 is formed such that a part (about one fourth) of the inner circumference of the through hole 78 is opened to the outer edge of the bolt retainer 77.

As illustrated in FIGS. 13 and 14, the bolt retainers 77 are disposed on the end faces 74 and 75 of the lower semicircular body 73, and then substantially a lower half of the centering bolt 81 is inserted into the through hole 78 (see FIG. 15) of the bolt retainer 77 and the centering hole 70 on each of the end faces 74 and 75 of the lower semicircular body 73 while two of the four centering bolts 81 are disposed on the left or right side of the lower semicircular body 73 and the other two centering bolts 81 are disposed on the other side. Thereafter, a nut 82 is screwed into each of the centering bolts 81 and is brought into contact with the top surface of the bolt retainer 77.

At this point, the inner circumference of the through hole 78 of the bolt retainer 77 and the outer circumference of the centering bolt 81 are disposed in surface contact with each other. This can prevent the orientations of the centering bolts 81 from tilting and deviating from the vertical direction, easily aligning the orientations of the centering bolts 81 in the vertical direction.

Figure 16:
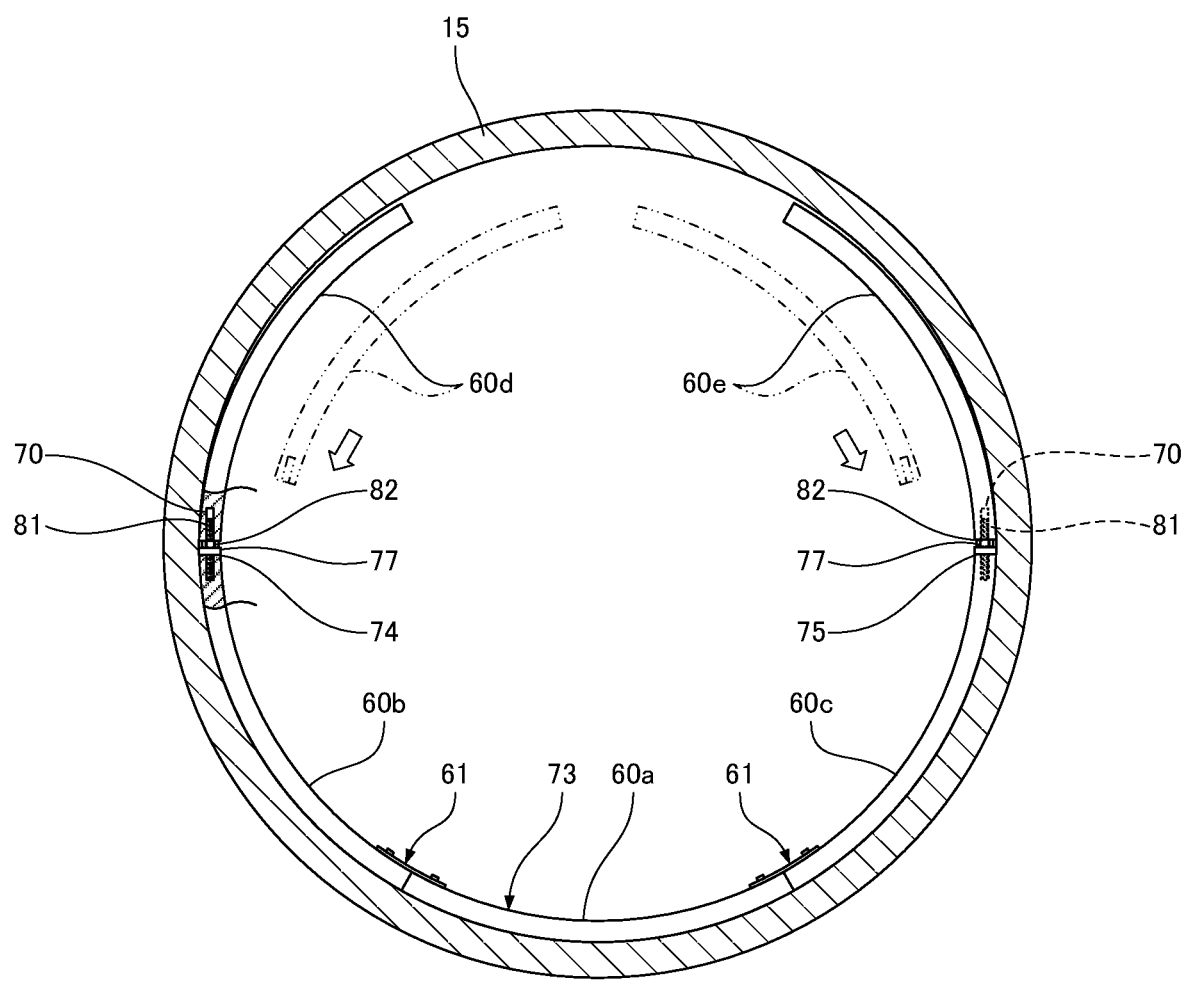
FIG. 16 is a diagram illustrating the procedure of assembling the spacer.
Figure 17:
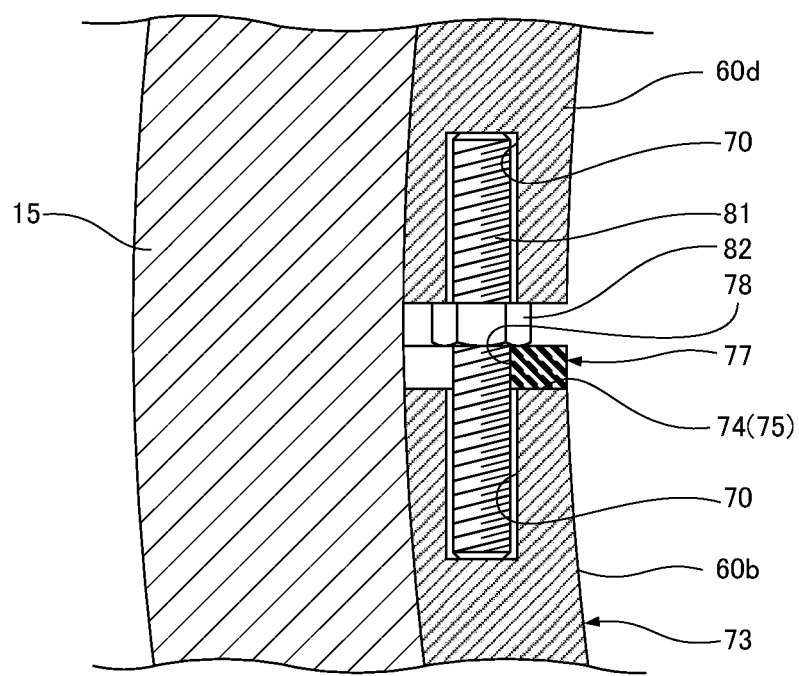
FIG. 17 is a diagram illustrating the procedure of assembling the spacer and an enlarged display of a cross section of a portion around the centering bolt.
Figure 18:
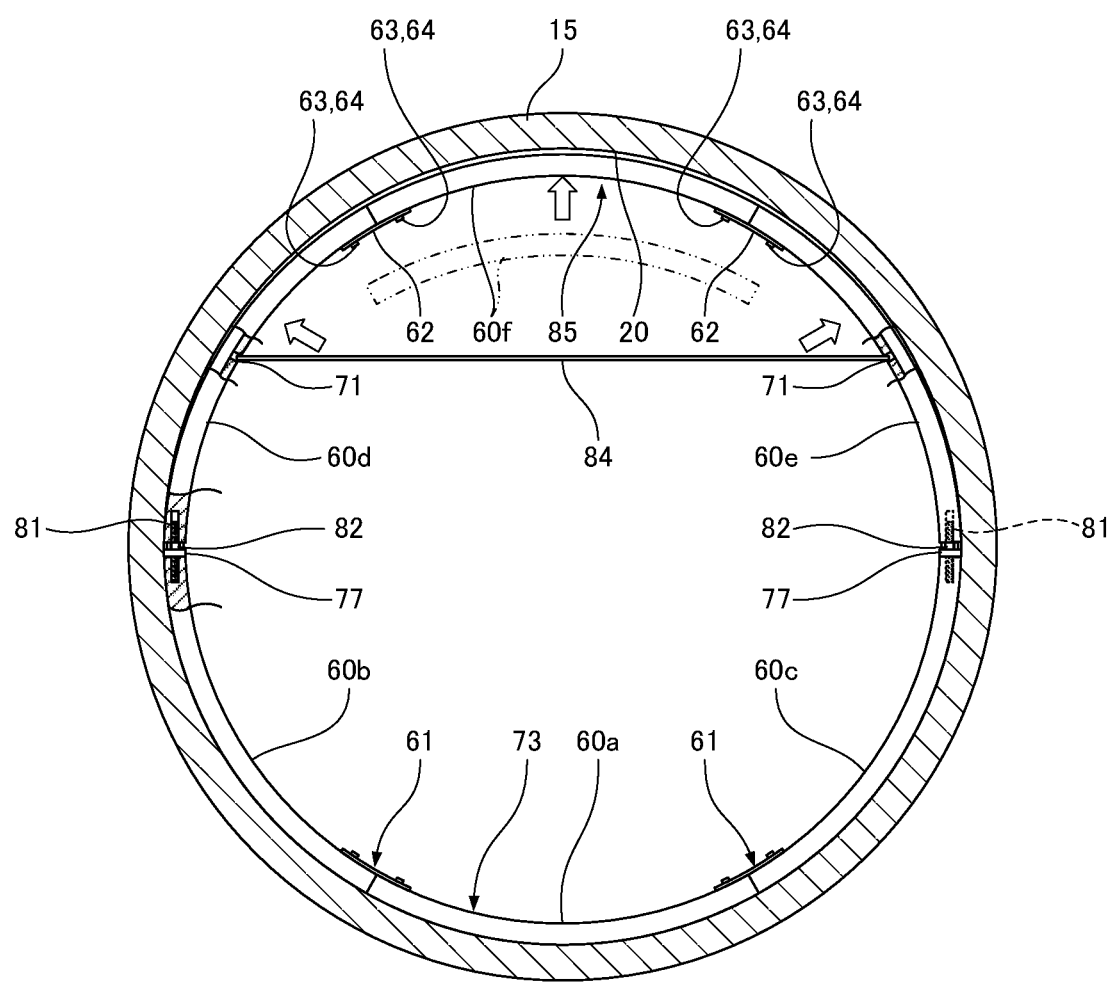
FIG. 18 is a diagram illustrating the procedure of assembling the spacer.

As illustrated in FIGS. 16 and 17, substantially an upper half of the centering bolt 81 projecting upward from each of the end faces 74 and 75 of the lower semicircular body 73 is inserted from below into the centering hole 70 on each of the upper dividing pieces 60d and 60e, another pair of left and right dividing pieces. In this state, as illustrated in FIG. 18, a tension rod 84 is inserted into the insertion hole 71 of the dividing piece 60d (see FIGS. 6 and 7), one of the upper dividing pieces on the left and right, and the insertion hole 71 of the other dividing piece 60e while being pressed against the dividing pieces. Thus, the upper dividing pieces 60d and 60e of the left-and-right pair are held without being dropped from above the lower semicircular body 73.

Thereafter, the uppermost dividing piece 60f is disposed between the upper dividing piece 60d and dividing piece 60e of the left-and-right pair, and the dividing pieces 60d to 60f of the upper half are connected to one another using the connector plates 62, the bolts 63, and the washers 64. Thus, as indicated by solid lines in FIG. 18, an upper semicircular body 85 corresponding to the upper half of the spacer 40 is formed.

Figure 19:
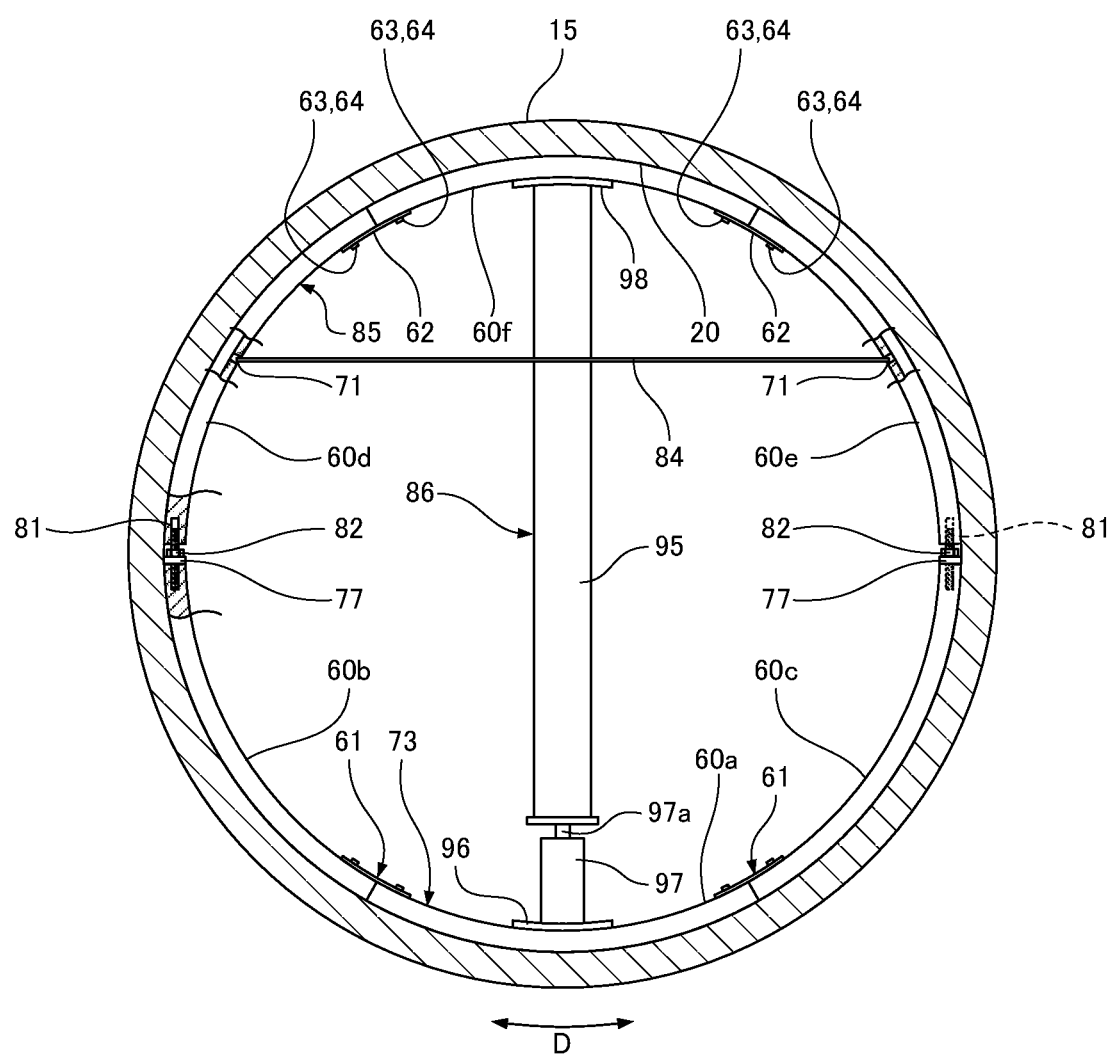
FIG. 19 is a diagram illustrating the procedure of assembling the spacer.

Thereafter, as illustrated in FIG. 19, a jack device 86 like a vertically extending pillar is disposed in the socket 15. The jack device 86 includes a hydraulic cylinder 97 that raises and lowers a pillar 95, a base plate 96 provided at the lower end of the hydraulic cylinder 97, and a receiving plate 98 provided at the upper end of the pillar 95.

The jack device 86 is actuated, a piston rod 97a of the hydraulic cylinder 97 is extended to lift the upper semicircular body 85 through the receiving plate 98, and the outer circumference of the upper semicircular body 85 is pressed onto the inner surface 20 of the socket 15.

Figure 20:
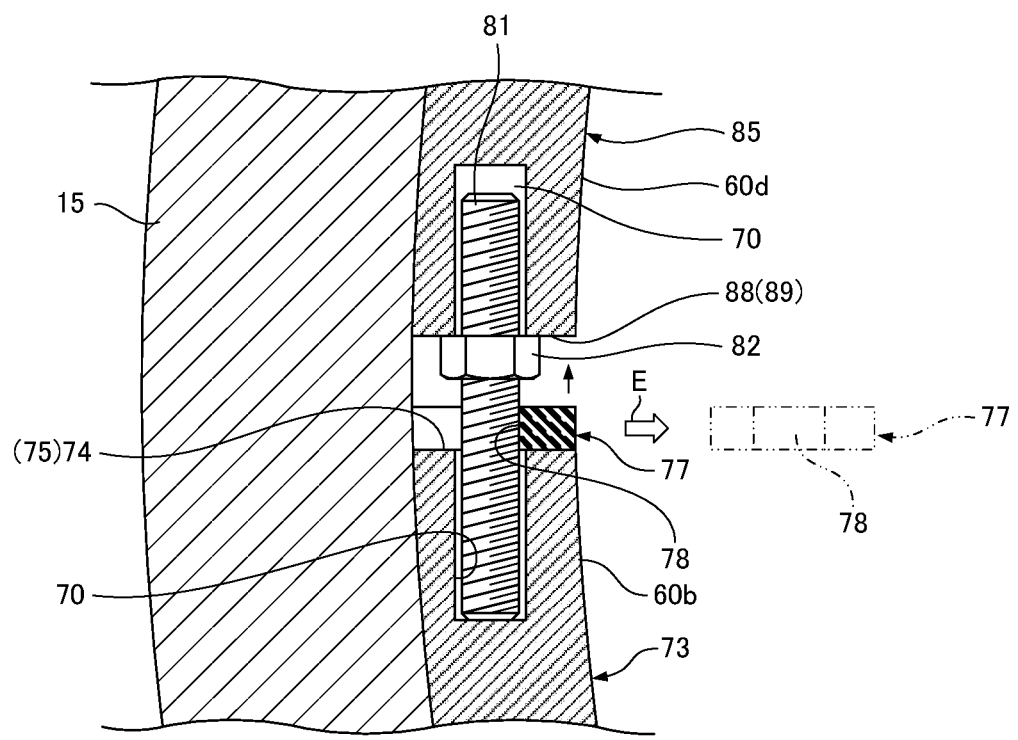
FIG. 20 is a diagram illustrating the procedure of assembling the spacer and an enlarged display of a cross section of a portion around the centering bolt.

In this state, as illustrated in FIG. 20, the nuts 82 are rotated to move upward and are brought into contact with both end faces 88 and 89 of the upper semicircular body 85 in the circumferential direction D. At this point, the centering bolts 81 are fixed by surface contact between the inner circumference of the through hole 78 of the bolt retainer 77 and the outer circumference of the centering bolt 81. This can prevent the centering bolt 81 from rotating with the nut 82.

Figure 21:
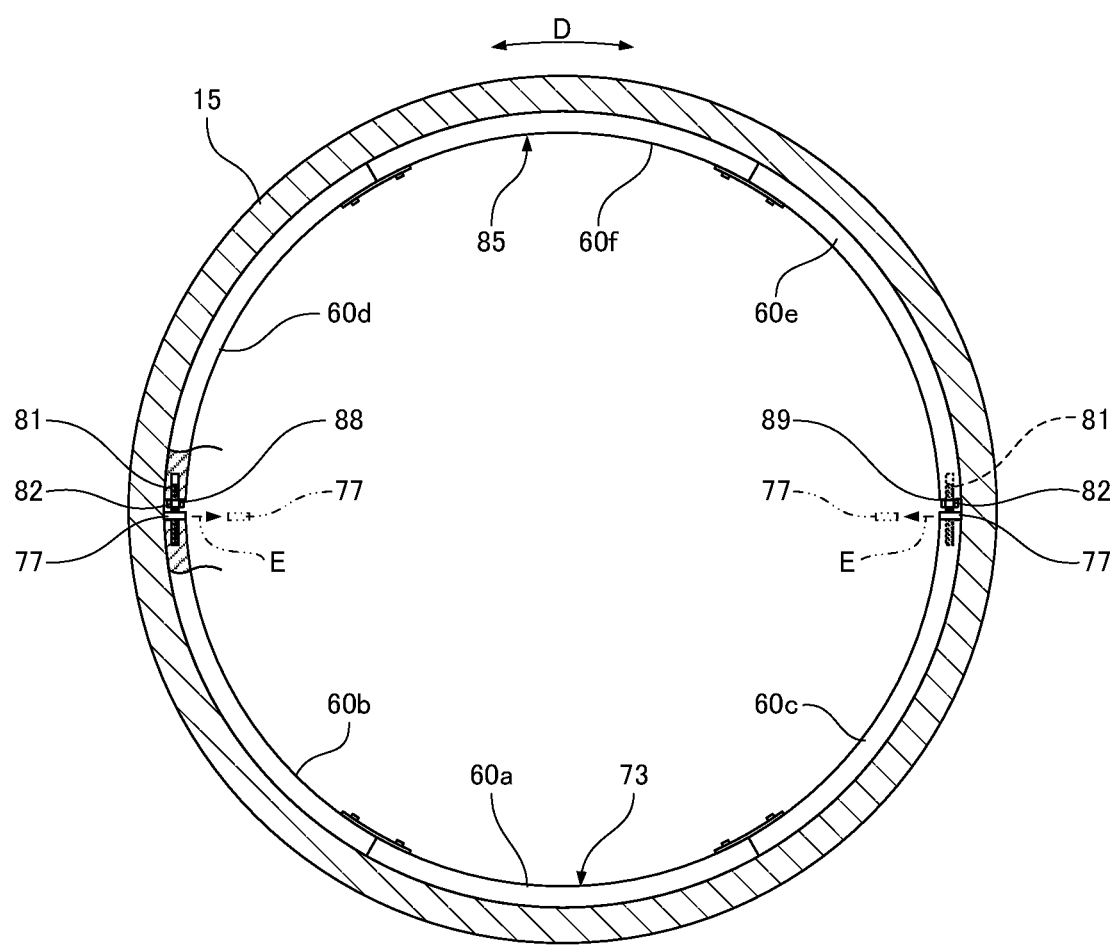
FIG. 21 is a diagram illustrating the procedure of assembling the spacer.

Thereafter, as illustrated in FIG. 21, the tension rod 84 is pulled out of the insertion holes 71 and is removed from the dividing pieces 60d and 60e of the upper semicircular body 85, and then the jack device 86 is detached and removed from the socket 15. Moreover, as indicated by virtual lines in FIG. 20 and virtual lines in FIG. 21, the bolt retainers 77 are removed from the end faces 74 and 75 of the lower semicircular body 73. At this point, a horizontal movement of the bolt retainer 77 to an inner side E in the radial direction B allows the centering bolt 81 to relatively separate to the outside the bolt retainer 77 from the inside of the through hole 78 of the bolt retainer 77 through the notch portion 79 (see FIG. 15), so that the bolt retainer 77 can be easily removed.

Thus, as illustrated in FIG. 5, the upper semicircular body 85 is supported above the lower semicircular body 73 through the centering bolts 81 and the nuts 82 while the outer circumference of the upper semicircular body 85 is pressed onto the inner surface 20 of the socket 15, so that the centered spacer 40 is set inside the socket 15.

In addition to the spacer 40 set inside the socket 15, the backup ring 36, the seal ring 30, and the gland 31 are fit onto the first pipe 11 in advance.

Figure 22:
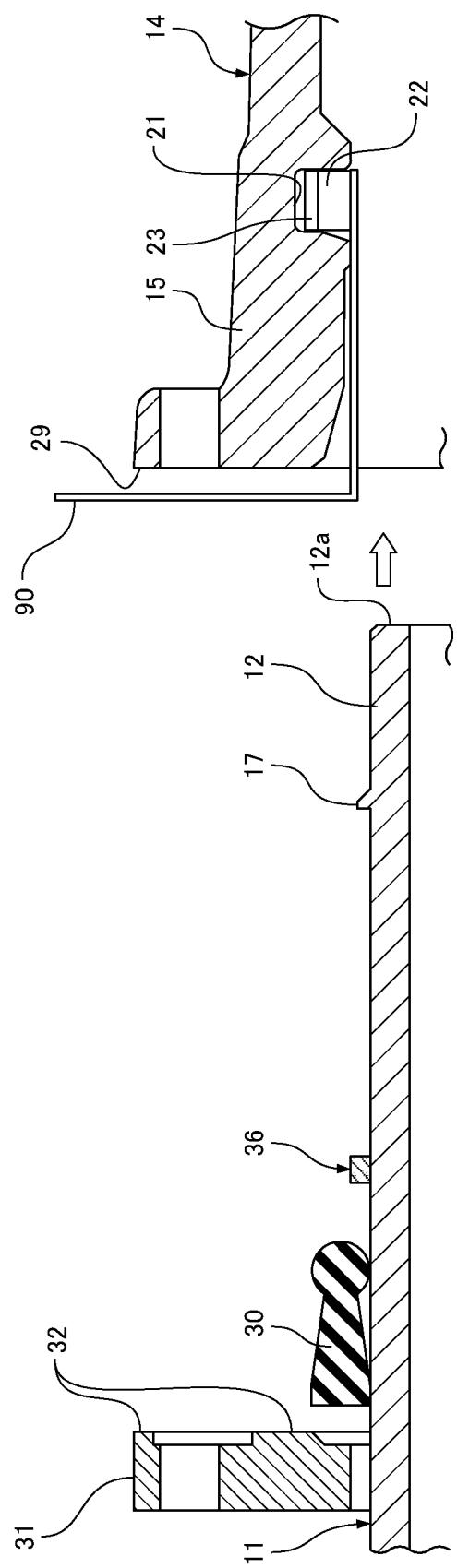
FIG. 22 is a cross-sectional view illustrating a method for joining the pipes of the pipe joint.

Moreover, the lock ring 22 and the pressing member 23 are housed in the groove 21 of the second pipe 14. As illustrated in FIG. 3, the width 26 of the cut portion 25 of the lock ring 22 is increased by the expander 27 to increase the diameter of the lock ring 22. As illustrated in FIG. 22, an L-shaped extended-diameter keeping tool 90 is inserted into the cut portion 25 of the lock ring 22, the expander 27 is removed, and the lock ring 22 is kept with the extended diameter.

Figure 23:
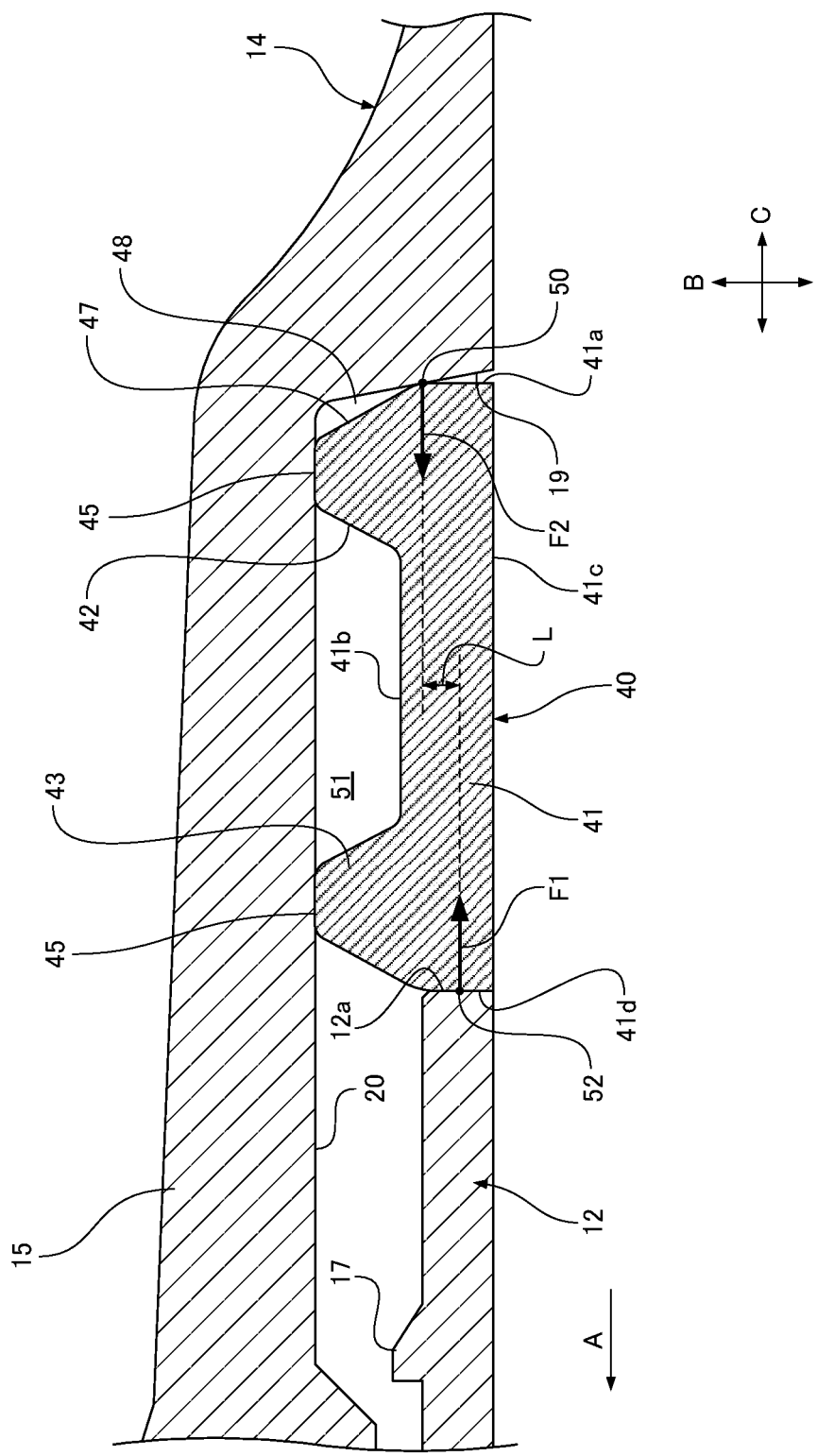
FIG. 23 is a cross-sectional view illustrating forces applied to the spacer provided in the pipe joint.
Figure 24:
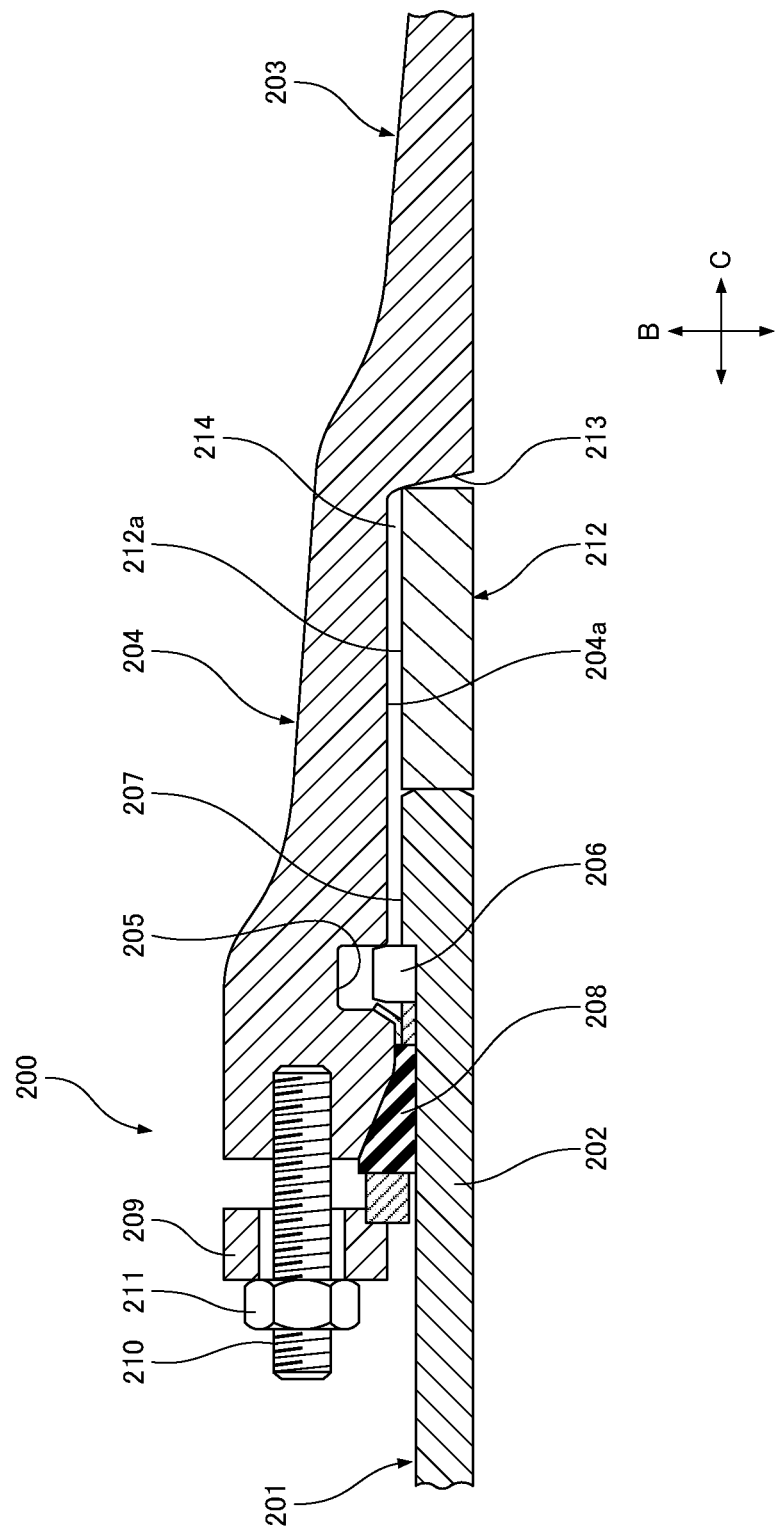
FIG. 24 is a cross-sectional view of a conventional pipe joint.

Thereafter, the spigot 12 is inserted into the socket 15, the spigot projection 17 is moved behind the lock ring 22 into the socket 15, and the end face 12a of the spigot 12 is brought into contact with an other end face 41d of the body 41 of the spacer 40 as illustrated in FIG. 23. At this point, the lock ring 22 is kept with the extended diameter by the extended-diameter keeping tool 90, so that the spigot projection 17 can easily pass through the inner circumference of the lock ring 22.

The extended-diameter keeping tool 90 is then removed to reduce the diameter of the lock ring 22. Thus, the lock ring 22 is fit onto the outer circumference of the spigot 12.

Thereafter, the backup ring 36 is moved into the socket 15 in the pipe axial direction C and is brought next to the lock ring 22.

The seal ring 30 is moved in the pipe axial direction C and is inserted between the outer surface of the spigot 12 and the inner surface of the socket 15. The gland 31 is coupled to the opening end of the socket 15 with the T bolts 33 and the nuts 34. The T bolts 33 and the nuts 34 are fastened until the contact portion 32 of the gland 31 comes into contact with the opening end face 29 of the socket 15. Thus, as illustrated in FIG. 2, the seal ring 30 is pressed between the outer surface of the spigot 12 and the inner surface of the socket 15 to be compressed in the radial direction B, so that the first pipe 11 and the second pipe 14 are joined by the pipe joint 10.

The operations and effects of the pipe joint 10 including the spacer 40 will be described below.

As illustrated in FIG. 4, the centering contact face 45 of the spacer 40 comes into contact with the inner surface 20 of the socket 15, thereby aligning the center of the spacer 40 with the center of the socket 15 without displacing the mounting position of the spacer 40 in the radial direction B. Hence, when the spacer 40 is mounted, the spacer 40 can be easily centered with respect to the socket 15. At this point, the centering contact face 45 of the first projection 42 and the centering contact face 45 of the second projection 43 are brought into contact with the inner surface 20 of the socket 15. Thus, the orientation of the spacer 40 is stabilized when the spacer 40 is mounted, achieving a proper centering operation of the spacer 40.

Since the concave portion 51 is formed between the first projection 42 and the second projection 43, the weight of the spacer 40 can be reduced.

As illustrated in FIG. 23, assuming that a force in the insertion direction of the spigot 12 is an insertion force F1, when the insertion force F1 is applied from the spigot 12 to the body 41 of the spacer 40, a reaction force F2 of the insertion force F1 is applied to the contact portion 50 of the spacer 40 from the deep end face 19 of the socket 15. The gap 48 is formed between the separating face 47 of the spacer 40 and the deep end face 19 of the socket 15, and the separating face 47 of the spacer 40 is separated from the deep end face 19 without coming into contact with the deep end face 19 of the socket 15.

Thus, the reaction force F2 is applied to the body 41 of the spacer 40 from the contact portion 50 and is hardly applied to the separating face 47 of the spacer 40. This can reduce deformation of a portion where the separating face 47 of the spacer 40 is formed, that is, the first projection 42.

As illustrated in FIGS. 8, 9, and 23, a distance L is, in the radial direction B, a distance between a first point 52 where the insertion force F1 is applied to the other end face 41d of the body 41 of the spacer 40 and a second point (that is, a point of the contact portion 50) where the reaction force F2 of the insertion force F1 is applied to the one end face 41a of the body 41 of the spacer 40.

The contact portion 50 lies between a position corresponding to the outer surface 41b of the body 41 of the spacer 40 in the radial direction B and a position corresponding to the inner surface 41c in the radial direction B. Hence, the distance L is shorter than in the case where the contact portion 50 lies outside the position corresponding to the outer surface 41b of the body 41 of the spacer 40 in the radial direction B.

A bending moment applied to the spacer 40 is proportionate to the distance L, so that the bending moment is reduced and a force applied to the spacer 40 substantially acts as a compressive force to the body 41 of the spacer 40 in the pipe axial direction C. Thus, the strength of the spacer 40 can be sufficiently kept.

In the foregoing embodiment, as illustrated in FIG. 1, the first pipe 11 and the second pipe 14 are both straight pipes and the configuration of the pipe joint 10 between the first pipe 11 and the second pipe 14 is shown. As another embodiment, a pipe joint may be provided such that one of the first pipe 11 and the second pipe 14 is a bent pipe and the other pipe is a straight pipe. Alternatively, as another embodiment, one of the first pipe 11 and the second pipe 14 may be a T-pipe and the other pipe may be a straight pipe.

In the foregoing embodiment, as illustrated in FIG. 2, the spacer 40 has the body 41 and the two projections 42 and 43. As another embodiment, the spacer 40 may have one or three or more projections. The spacer 40 has the concave portion 51 between the projections 42 and 43. As another embodiment, the concave portion 51 may be filled to be eliminated.

In the foregoing embodiment, as illustrated in FIG. 9, the contact portion 50 lies between the position corresponding to the outer surface 41b of the body 41 in the radial direction B and the position corresponding to the inner surface 41c in the radial direction B. As another embodiment, the contact portion 50 may lie, in the radial direction B, outside the position corresponding to the outer surface 41b of the body 41 in the radial direction B.

In the foregoing embodiment, as illustrated in FIG. 5, the spacer 40 is divided into the six dividing pieces 60a to 60f. The number of dividing pieces is not limited to six. As another embodiment, the spacer 40 may be divided into a plurality of dividing pieces such that the number of dividing pieces is not six.

According to the description of the embodiment, techniques are disclosed as follows:

(Technique 1)

A pipe joint in which a spigot formed on a first pipe is inserted into a socket formed on a second pipe, the pipe joint including:

a groove formed on an inner surface of the socket;
a lock ring housed in the groove;
an engaging portion that is formed on an outer surface of the spigot and is engageable with the lock ring from a deeper portion of the socket;
a distal end portion formed on the spigot;
a deep end face formed in the socket; and a spacer that is mounted between the distal end portion of the spigot and the deep end face of the socket and is for limiting the movement of the spigot in an insertion direction;

wherein the spacer has a cylindrical body sandwiched between the distal end portion of the spigot and the deep end face of the socket, a contact portion in contact with the deep end face of the socket at an end portion of the body in a pipe axial direction, a centering contact face in contact with the inner surface of the socket, and a separating face that is separated from the deep end face of the socket in a removing direction along which the spigot is removed from the socket, a gap surrounded by the separating face of the spacer, the deep end face of the socket, and the inner surface of the socket is formed, the gap lies outside the contact portion of the spacer in a radial direction, and the separating face of the spacer faces the deep end face of the socket in the pipe axial direction and is formed between the contact portion and the centering contact face in the radial direction.

With this configuration, the centering contact face of the spacer comes into contact with the inner surface of the socket, thereby aligning a center of the spacer with a center of the socket without displacing a mounting position of the spacer in the radial direction. Hence, when the spacer is mounted, the spacer can be easily centered with respect to the socket.

The gap is formed between the separating face of the spacer and the deep end face of the socket, and the separating face of the spacer is separated from the deep end face without coming into contact with the deep end face of the socket. Hence, assuming that a force in the insertion direction of the spigot is an insertion force, even when the insertion force is applied from the spigot to the body of the spacer and a reaction force of the insertion force is applied to the body of the spacer from the deep end face of the socket, the reaction force of the insertion force is hardly applied to the separating face of the spacer. This can reduce deformation of a portion where the separating face of the spacer is formed.

(Technique 2)

The pipe joint according to technique 1, wherein the spacer has projections that project outward from an outer circumference of the body in the radial direction, the centering contact face is formed on an outer circumference of the projection, the separating face is formed on the projection and is tilted in the removing direction of the spigot toward the centering contact face from the contact portion, and the contact portion is formed at a boundary portion between the end face and the separating face of the body of the spacer that faces the deep end face of the socket.

With this configuration, even when the insertion force is applied from the spigot to the body of the spacer and a reaction force of the insertion force is applied to the body of the spacer from the deep end face of the socket, the reaction force of the insertion force is hardly applied to the separating face of the spacer. This can reduce deformation of the projection of the spacer.

(Technique 3)

The pipe joint according to technique 2, wherein the projections are formed at a plurality of locations in the pipe axial direction of the body of the spacer, the separating face is formed on the projection at a deepmost position of the socket, the centering contact face is formed on the outer circumference of each of the projections, and between the projections opposed to each other in the pipe axial direction, a concave portion is formed so as to be recessed inward in the radial direction.

With this configuration, the centering contact faces of the projections of the spacer come into contact with the inner surface of the socket. Thus, an orientation of the spacer is stabilized when the spacer is mounted, achieving high workability during a centering operation of the spacer. Since the concave portion is formed between the projections, a weight of the spacer can be reduced.

(Technique 4)

The pipe joint according to any one of techniques 1 to 3, wherein the contact portion lies between a position corresponding to the outer surface of the body of the spacer in the radial direction and a position corresponding to the inner surface of the body in the radial direction.

With this configuration, when the insertion force is applied from the spigot to the body of the spacer, a reaction force of the insertion force is applied to the contact portion of the spacer from the deep end face of the socket. The contact portion of the spacer lies between a position corresponding to the outer surface of the body of the spacer in the radial direction and a position corresponding to the inner surface in the radial direction. Thus, in the radial direction, a distance between a first point where the insertion force is applied to the spacer and a second point where the reaction force of the insertion force is applied to the spacer is shorter than in the case where the contact portion of the spacer lies outside a position corresponding to the outer surface of the body of the spacer in the radial direction.

A bending moment applied to the spacer is proportionate to the distance between the first point and the second point in the radial direction, so that the bending moment is reduced and a force applied to the spacer substantially acts as a compressive force to the body of the spacer in the pipe axial direction. Thus, a strength of the spacer can be sufficiently kept.

(Technique 5)

A spacer provided in the pipe joint according to any one of techniques 1 to 4, wherein the spacer is divided into a plurality of arc-shaped dividing pieces in a circumferential direction, and ends of the dividing pieces adjacent to each other in the circumferential direction are connected to each other.

With this configuration, a cylindrical spacer can be assembled by connecting the plurality of dividing pieces in the socket.

(Technique 6)

A dividing piece of a spacer, the dividing piece constituting the spacer according to technique 5, wherein the dividing piece has connecting portions on both ends.

With this configuration, the connecting portion of one of the dividing pieces adjacent to each other in the circumferential direction and the connecting portion of the other dividing piece are connected via a connector, so that the dividing pieces can be connected to each other.

What is claimed is:

1. A pipe joint in which a spigot formed on a first pipe is inserted into a socket formed on a second pipe, the pipe joint comprising:

a groove formed on an inner surface of the socket;
a lock ring housed in the groove;

an engaging portion that is formed on an outer surface of the spigot and is engageable with the lock ring from a deeper portion of the socket;

a distal end portion formed on the spigot;

a deep end face formed in the socket; and a spacer that is mounted between the distal end portion of the spigot and the deep end face of the socket and is for limiting movement of the spigot in an insertion direction, wherein the spacer includes:

a cylindrical body sandwiched between the distal end portion of the spigot and the deep end face of the socket;

a contact portion in contact with the deep end face of the socket at an end portion of the cylindrical body in a pipe axial direction;

a centering contact face in contact with the inner surface of the socket; and a separating face that is separated from the deep end face of the socket in a removing direction along which the spigot is removed from the socket, wherein a gap surrounded by the separating face of the spacer, the deep end face of the socket, and the inner surface of the socket is formed, wherein the gap lies outside the contact portion of the spacer in a radial direction, and wherein the separating face of the spacer faces the deep end face of the socket in the pipe axial direction and is formed between the contact portion and the centering contact face in the radial direction.

2. The pipe joint according to claim 1, wherein the spacer has a projection that projects outward from an outer circumference of the cylindrical body in the radial direction, wherein the centering contact face is formed on an outer circumference of the projection, wherein the separating face is formed on the projection and is tilted in the removing direction of the spigot toward the centering contact face from the contact portion, and wherein the contact portion is formed at a boundary portion between an end face of the cylindrical body of the spacer that faces the deep end face of the socket and the separating face.

3. The pipe joint according to claim 2, wherein the projection is one of a plurality of projections formed at a plurality of locations in the pipe axial direction of the cylindrical body of the spacer, wherein the separating face is formed on one of the projections located at a deepmost position of the socket, wherein the centering contact face is formed on the outer circumference of each of the projections, and wherein, between the projections opposed to each other in the pipe axial direction, a concave portion is formed so as to be recessed inward in the radial direction.

4. The pipe joint according to claim 1, wherein the contact portion lies between a position corresponding to an outer surface of the cylindrical body of the spacer in the radial direction and a position corresponding to an inner surface of the cylindrical body in the radial direction.

5. A spacer provided in the pipe joint according to claim 1, wherein the spacer is divided into a plurality of arc-shaped dividing pieces in a circumferential direction, and ends of the dividing pieces adjacent to each other in the circumferential direction are connected to each other.

6. A dividing piece constituting the spacer according to claim 5, wherein the dividing piece has connecting portions on both ends in the circumferential direction.

\* \* \* \* \*